United States Patent [19]

Purvis et al.

[11] Patent Number: 5,636,877
[45] Date of Patent: Jun. 10, 1997

[54] SWIVEL CONNECTION

[75] Inventors: Michael J. Purvis; Leonard J. Hartmann; Gerald L. Rogers, all of St. Louis, Mo.

[73] Assignee: Dyna Controls Corporation, St. Clair, Mo.

[21] Appl. No.: 428,049

[22] Filed: Apr. 25, 1995

Related U.S. Application Data

[63] Continuation-in-part of Ser. No. 218,074, Mar. 25, 1994, Pat. No. 5,451,031.

[51] Int. Cl.$^6$ ..................................................... F16L 11/12
[52] U.S. Cl. ..................... 285/45; 285/168; 285/190; 285/921; 285/901
[58] Field of Search ............................. 285/45, 901, 190, 285/38, 315, 316, 168, 921; 251/149.9

[56] References Cited

U.S. PATENT DOCUMENTS

| | | | |
|---|---|---|---|
| 3,023,030 | 2/1962 | Torres | 285/316 X |
| 3,097,865 | 7/1963 | Zeeb et al. | 285/45 X |
| 3,477,688 | 11/1969 | Cruse | 251/149.9 |
| 3,684,321 | 8/1972 | Hundhausen et al. | 285/316 |
| 3,799,584 | 3/1974 | Slocum | 285/45 |
| 4,362,324 | 12/1982 | Kelly | 285/190 X |
| 4,602,807 | 7/1986 | Bowers | 285/45 |
| 4,682,795 | 7/1987 | Rabushka et al. | 285/316 X |
| 4,765,657 | 8/1988 | Cruse | 285/315 X |
| 5,127,678 | 7/1992 | Henning | 285/38 X |
| 5,403,041 | 4/1995 | Merkel et al. | 285/190 X |

FOREIGN PATENT DOCUMENTS

| | | | |
|---|---|---|---|
| 1303139 | 7/1962 | France | 285/45 |
| 587237 | 1/1959 | Italy | 285/316 |

*Primary Examiner*—Dave W. Arola
*Attorney, Agent, or Firm*—Cohn, Powell & Hind, P.C.

[57] ABSTRACT

This swivel connection (10) of metallic material includes a female block (12), a center spool (14) and a male spool (16) which provide substantially universal movement between a hose line connection (18) and pneumatic tool (1). A protective cover (80) is provided for the female block (12) and a protective cover (82) is provided for the exposed portion of the center spool (14). Both covers are of non-mar plastic material to protect finished surfaces with which the swivel connection (10) comes into contact during use. Both covers include access openings (92, 112) having snap-fitted removable caps (100, 120).

13 Claims, 2 Drawing Sheets

SWIVEL CONNECTION

This is a continuation-in-part of application Ser. No. 08/218,074 filed on Mar. 25, 1994 now U.S. Pat. No. 5,451,031.

BACKGROUND OF THE INVENTION

This invention relates generally to swivel connections for use in connecting hose lines to tools such as air tools and particularly to a swivel connection which is provided with a non-mar cover.

Swivel connections have been used as standard equipment for many years for air guns and similar tools which find use, for example, in automobile plants. The swivel connection permits a high degree of universal movement of the tool relative to the air hose which is very useful for the operator. When used in an environment such as an automobile factory swivel connections, which are generally manufactured from hard metal parts, can mar the finished surface of automobiles, and the like, when they are dragged across the finished surfaces. Non-mar quick-connect-disconnect couplings for use between hose-to-hose connections are known, for example, as shown in copending U.S. application Ser. No. 08/218,074, now U.S. Pat. No. 5,451,031, issued on Sep. 19, 1995, owned by the assignee of the present application. However, there remains the problem of protecting the universal swivel connection at the end of the hose line, which is intended to be attached directly to the tool.

The present protected connection solves these and other problems in a manner not disclosed in the known prior art.

SUMMARY OF THE INVENTION

This swivel connection provides a sealed universal connection, having a non-mar protective cover, which is connected, for example, directly to a pneumatic tool and protects finished surfaces with which the connection comes into contact.

This swivel connection provides a durable and reliable and effective swivel connection between and air hose and a pneumatic tool but without the hard metal outer parts which can be damaging to finished surfaces.

An advantage is achieved by providing the swivel connection, which may consist of three swivel connected parts including a female inlet part connectible to a fluid line, a center part, and a male outlet part connectible to a fluid operated tool, with an integrally molded cover for the female part and for the exposed portion of the center part, the cover being of high impact plastic, such as acetal copolymer which essentially covers all metal parts and virtually eliminates accidental nicks and scratches, saving time and expense in costly retouching or painting.

Another advantage is that the use of plastic covering emphasizes light weight as well as durability and reduces the risk of repetitive stress trauma to the operator, a major source of reduced productivity.

This non-mar swivel connection for a fluid line comprising an inlet body including an inlet portion; an intermediate body connected in rotatable relation to said inlet body; an outlet body including an outlet portion, and connected in rotatable relation to said intermediate body; a first protective cover of non-mar material disposed about said inlet body; and a second protective cover of non-mar material disposed about said intermediate body.

This non-mar swivel connection for a fluid line comprises an inlet body including an inlet portion defining a flow axis and a journal portion; an intermediate body including a spool portion defining a flow axis and a journal portion, said spool portion being received in rotatable relation within the journal portion of said inlet body; an outlet body including a spool portion defining a flow axis and an outlet portion, said spool portion being received in rotatable relation within the journal portion of said intermediate body; a first protective cover of non-mar material disposed about said inlet portion of inlet body and said journal portion of said inlet body, and a second protective cover of non-mar material disposed about said journal portion of intermediate body.

It is an aspect of this invention to provide that the intermediate body spool portion includes an end remote from the journal portion, and the first protective cover includes an access opening adjacent said remote end.

It is another aspect of this invention to provide that the first protective cover access opening includes a removable cap and another aspect to provide that the removable cap is substantially flush with the surrounding portion of the protective cover.

It is yet another aspect of this invention to provide that the outlet body includes an end remote from the outlet portion, and the second protective cover includes an access opening adjacent said remote end.

It is still another aspect of this invention to provide that the second protective cover access opening includes a removable cap substantially flush with the surrounding portion of the protective cover.

It is yet another aspect of this invention to provide that said removable covers are snap-fitted into said openings and are substantially flush with the surrounding portion of the associated protective cover.

It is another aspect of this invention to provide that the remote end of the intermediate body spool portion is open and includes a removable plug sealing said remote end.

It is an aspect of this invention to provide that said inlet and intermediate bodies include exposed surfaces and said first and second protective covers cooperating to protect otherwise exposed surfaces of said inlet and intermediate bodies.

This invention provides an improved swivel connection which is relatively simple and inexpensive to manufacture and is particularly efficient for its intended purpose.

DESCRIPTION OF THE PREFERRED EMBODIMENT

Figure 7:
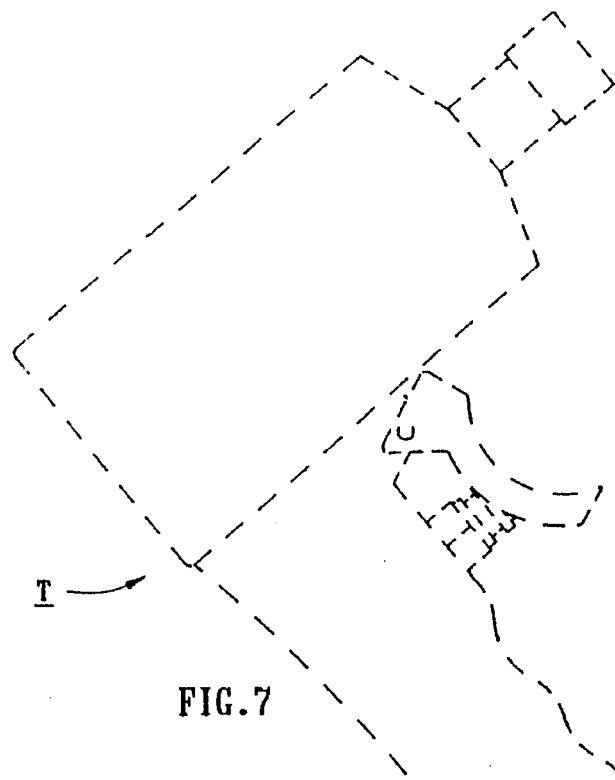
FIG. 7 is a simplified elevational view showing the swivel connection in use with a pneumatic tool.
Figure 1:
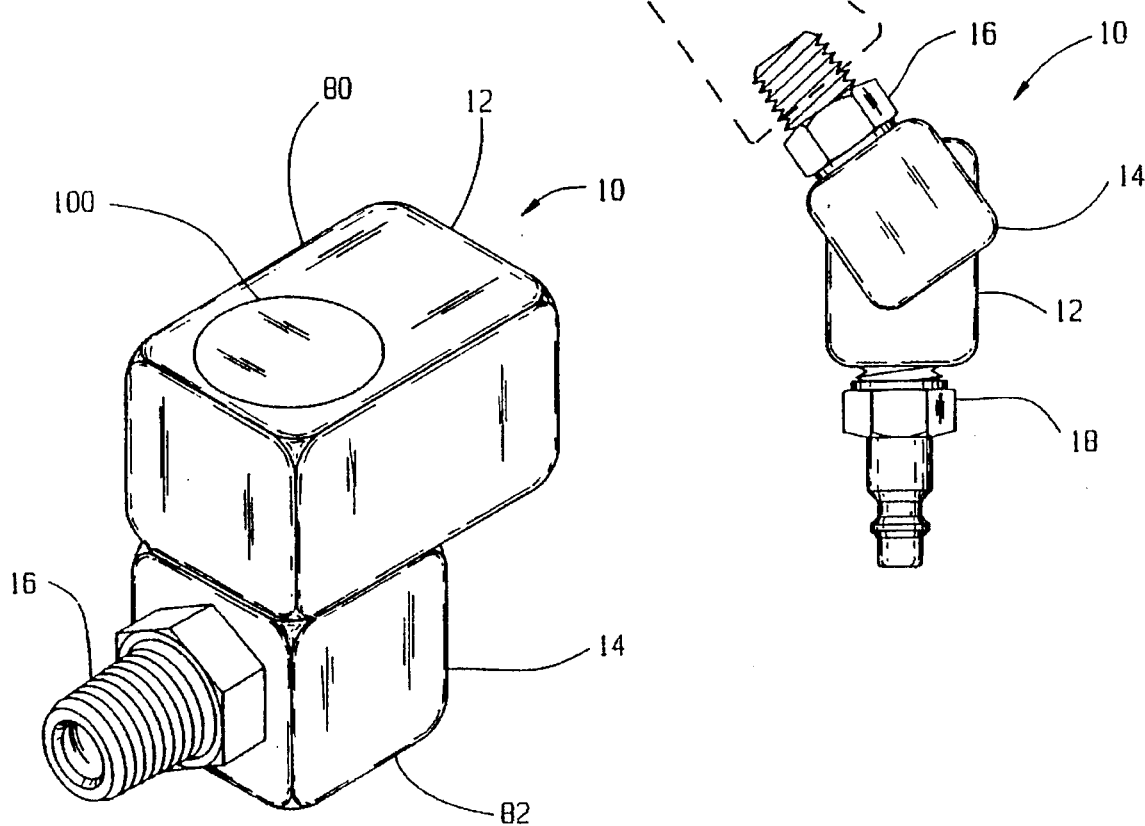
FIG. 1 is a perspective view of the swivel connection.
Figure 2:
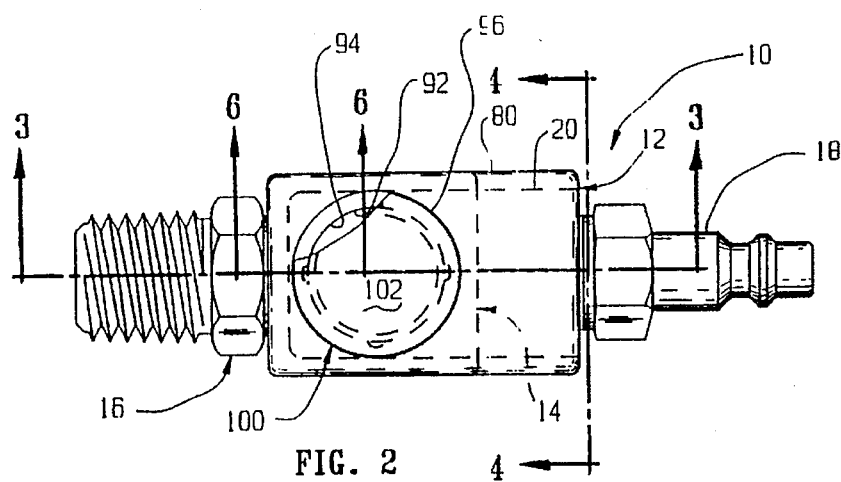
FIG. 2 is a plan view of the connection.
Figure 3:
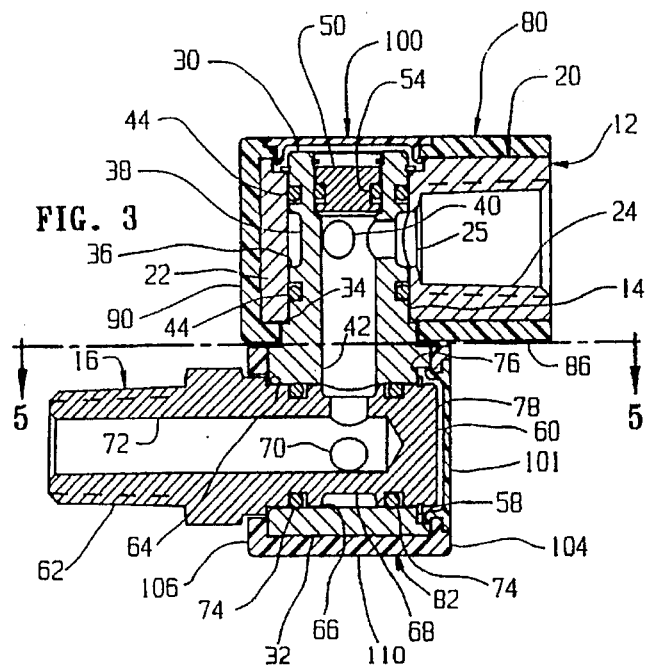
FIG. 3 is a cross-sectional view taken on line 3—3 of FIG. 2.
Figure 4:
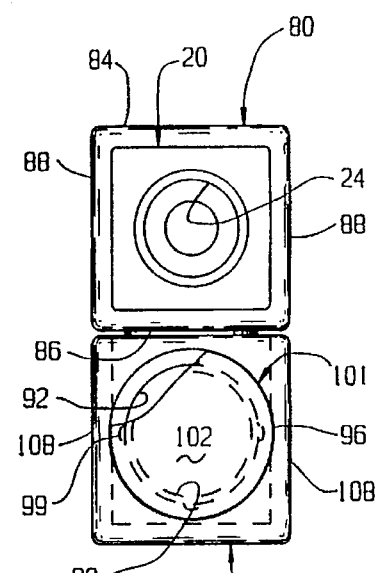
FIG. 4 is an end view taken on line 4—4 of FIG. 2 with the hose connection removed.
Figure 5:
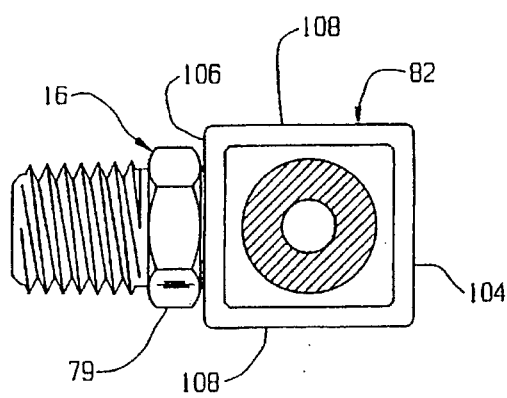
FIG. 5 is a cross-sectional view taken on line 5—5 of FIG. 3.

Referring now by reference numerals to the drawings and first to FIGS. 1–5, it will be understood that the swivel connection 10 includes three mutually movable connected parts which provide substantially universal movement between a fluid line connection and a fluid operated tool such as the pneumatically operated air gun indicated by T in FIG. 7.

The three parts are made from a metallic material such as aluminum. The first part is a female block 12, constituting a inlet body, the second part is a center spool 14, constituting an intermediate body, and the third part is a male spool 16 constituting an outlet body. In order to provide a protective non-mar cover for the swivel connection 10, two independent covers of plastic or other non-metallic, non-mar material, such as high impact acetal copolymer, are provided to protect finished surfaces with which they come into contact. One cover for the female block 12 is generally indicated by numeral 80 and the other cover for the center spool is generally indicated by numeral 82.

More specifically, the female block 12 includes an inlet portion 20 and a journal portion 22. The inlet portion 20 includes a passage 24 defining a flow axis and being internally threaded to receive a hose connection 18. The passage 24 includes an end opening 25 communicating with the interior surface of the journal portion 22. The journal portion 22 includes a recess 28 at its outer end.

The center spool 14 includes a spool portion 30 and a journal portion 32. The spool portion 30 is stepped to provide an abutment 34 and to provide a reduced diameter portion 36 received in rotatable relation within the journal portion 22 of the female block 12. The spool portion 30 includes an annular groove 38, which communicates with the female block opening 25, and is provided with apertures 40 communicating with the central passage 42. The spool portion 30 is also grooved on each side of the annular groove 38 to receive a pair of O-ring seals 44 and, at its outer remote end is grooved to receive a snap ring 46. The snap ring 46 and the abutment 34 cooperate to retain the spool portion 30 longitudinally within the female block journal portion 22. Also at its outer end the spool portion 30 includes an interior step 48 and is grooved to receive a snap ring 52 to retain an end plug 50 which is grooved to receive an O-ring seal 54. The spool portion central passage 42 communicates with the interior surface of the journal portion 32. The journal portion 32 includes a recess 58 at its outer end.

The male spool 16 includes a spool portion 60 and an outlet portion 62. The spool portion 60 is stepped to provide an abutment 64 and to provide a reduced diameter portion 66 received in rotatable relation within the journal portion 32 of the center spool 14. The spool portion 60 includes an annular groove 68, which communicates with the center spool passage 42 which defines a flow axis and is provided with apertures 70 communicating with the central passage 72 of the outlet portion 62, said passage 72 also defining a flow axis. The spool portion 60 is also grooved on each side of the annular groove 68 to receive a pair of O-rings 74 and, at its outer, remote end is grooved to receive a snap ring 76. The snap ring 76 and the abutment 64 cooperate to retain the spool portion 60 within the center spool journal portion 32. At its outer end, the passage 72 includes an end wall 78.

The male spool outlet portion 62 is externally threaded to be received within the compatibly threaded inlet (not shown) of the pneumatic air gun T, see FIG. 7, and also is provided with a nut configuration 79 to facilitate attachment to said air gun.

The protective covers 80 and 82 provide a virtually complete non-mar cover for the exposed exterior of the female block 12 and the exposed exterior of the center spool 16. In the preferred embodiment, the covers 80 and 82 are premolded to fit onto the female block 12 and the center spool 16 as will be described later.

It is thought that the structural arrangement of the protective swivel connection has been fully understood from the foregoing description of parts, but for completeness of disclosure the assembly of the connection will be briefly described.

Initially, the female block 12 is slipped into the protective cover portion 80 with the cap 100 removed. Likewise, the center spool 16 is slipped into the protective cover portion 82 with the cap 101 removed.

Figure 6:
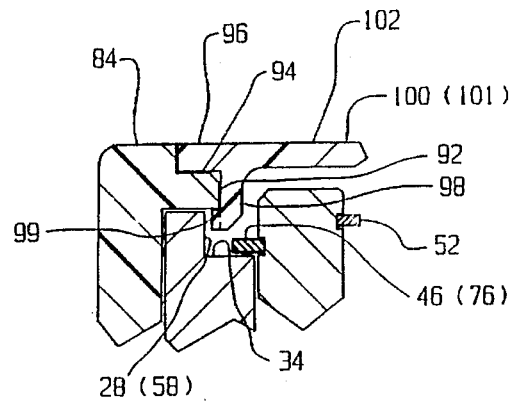
FIG. 6 is an enlarged fragmentary cross-sectional view taken on line 6—6 of FIG. 2.

The protective cover 80 is fitted directly onto the female block 12 to provide opposed side walls 84 and 86, opposed side walls 88 and end wall 90. An access opening 92 is provided in the side wall 84 having an annular stepped lip 94. The stepped lip 94 receives the rim 96 of a compatibly configurated cap 100 and the cap includes an internal flange 98 compatibly configurated to fit in said opening lip 94 and provided with equally spaced lugs 99 so that the cap 100 is received in snap-fitted relation. The fitted cap 100 includes a flat outer surface 102 so that it is flush with the surrounding face of the side wall 84 as best shown in FIG. 6. The cover side wall 86 includes an opening 104 sized to receive the center spool reduced diameter portion 36.

The protective premolded cover 82 is fitted directly onto the journal portion of the center block 14 to provide opposed side walls 104 and 106, opposed side walls 108 and side wall 110. Similar to the female block 12 an access opening 92 is provided in the side wall 104 having an annular stepped lip 94. The stepped lip 94 receives the rim 96 of a compatibly configurated cap 101, which, in the embodiment shown identical to cap 100, and the cap includes an internal flange 98 compatibly configurated to fit in said access opening lip 94 and provided with equally spaced lugs 99 so that the cap 100 is received in snap-fitted relation. The fitted cap 101 includes a flat outer surface 102 so that it is flush with the surrounding face of the side wall 104. The cover side wall 106 includes an opening sized to receive the male spool reduced diameter portion 66.

The provision of caps 100 and 101, facilitates assembly and provides that the center spool, spool portion 30 can be inserted into the female block journal portion 22 before the cap 100 is fitted into the access opening 92. Thus, the snap ring 46 can be fitted into place, by virtue of the recess 28, following which the cap 100 can be snapped into place. Similarly the male spool, spool portion 60 can be inserted into the center spool journal portion 62 before the cap 101 is fitted into the access opening 92. Thus, the snap ring 58 can be fitted into place by virtue of the recess 76, following which the cap 101 can be snapped into place. The swivel connection 10 is now fully assembled and can be attached between the hose connection 18 and then to the pneumatic tool T.

Because of the O-ring seals provided on both spool portions, the spool portions can readily be rotated in their respective journal portions without loss of air pressure.

It will be understood that the female inlet block 12 the center block 14, in particular, without the protective covers 80 and 82 would have exposed metal surfaces and that the protective covers 80 and 82 cooperate to substantially protect these exposed metal surfaces so that they do not cause scratches and other expensive damage to painted and other finished surfaces.

Although the invention has been described by making detailed reference to a preferred embodiment, such detail is to be understood in an instructive, rather that in a restrictive sense, many variants being possible within the scope of the claims hereunto appended.

We claim as our invention:

1. A non-mar swivel connection for a fluid line comprising:

(a) an inlet body including an inlet portion having a passage which defines a flow axis, (b) an intermediate body having a passage which defines a flow axis, (c) means connecting said intermediate body in rotatable relation to said inlet body with communication between said passages, (d) an outlet body including an outlet portion, having a passages which defines a flow axis, (e) means connecting said outlet body in rotatable relation to said intermediate body with communication between said passages, said flow axes of said inlet body and said outlet body being rotatable in substantially parallel planes, (f) a first protective cover of non-mar material disposed about said inlet body, and (g) a second protective cover of non-mar material disposed about said intermediate body said protective covers substantially protecting against article-marring by the swivel connection.

2. A non-mar swivel connection for a fluid line comprising: (a) an inlet body including an inlet portion having a passage which defines a flow axis and a journal portion, (b) an intermediate body including a spool portion having a passage which defines a flow axis and a journal portion, (c) means connecting said spool portion in rotatable relation within the journal portion of said inlet body with communication between said passages, (d) an outlet body including a spool portion having a passage which defines a flow axis and an outlet portion, (e) means connecting said spool portion in rotatable relation within the journal portion of said intermediate body with communication between said passages, (f) a first protective cover of non-mar material disposed about said inlet portion of said inlet body and said journal portion of said inlet body, and (g) a second protective cover of non-mar material disposed about said journal portion of intermediate body.

3. A swivel connection as defined in claim 1, in which:

(j) said remote end is open and includes a removable plug sealing said remote end.

4. A swivel connection as defined in claim 2, in which:

(h) the intermediate body spool portion includes an end remote from the journal portion, and (i) the first protective cover includes an access opening adjacent said remote end.

5. A swivel connection as defined in claim 4 in which:

(j) said access opening includes a removable cap.

6. A swivel connection as defined in claim 5 in which:

(k) the removable cap is substantially flush with the surrounding portion of the protective cover.

7. A swivel connection as defined in claim 2, in which:

(h) the outlet body includes an end remote from the outlet portion, and (i) the second protective cover includes an access opening adjacent said remote end.

8. A swivel connection as defined in claim 7, in which:

(j) said access opening includes a removable cap.

9. A swivel connection as defined in claim 8, in which:

(k) said removable cap is substantially flush with the surrounding portion of the protective cover.

10. A non-mar swivel connection for a fluid line comprising:

(a) an inlet body including an inlet portion having a passage which defines a flow axis and a journal portion, (b) an intermediate body including a spool portion having a passage which defines a flow axis, and a journal portion, said spool portion having an end remote from said journal portion, (c) means connecting said spool portion in rotatable relation within the journal portion of said intermediate body with communication between said passages;

(d) an outlet body having a passage which defines a flow axis including a spool portion having a passage which defines a flow axis and an outlet portion, said spool portion having an end remote from said journal portion, (e) means connecting said spool portion in rotatable relation within the journal portion of said intermediate body with communication between said passages;

(f) a first protective cover of non-mar material disposed about said inlet portion of said inlet body and said journal portion of said inlet body and having an access opening adjacent said intermediate body remote end and having a removable cap coaxial with said flow axis, and (g) a second protective cover of non-mar material disposed about said journal portion of said intermediate body and having an access opening adjacent said outlet body remote end and having an removable cover coaxial with said flow axis.

11. A swivel connection as defined in claim 10, in which:

(h) said removable covers are snap-fitted into said openings and are substantially flush with the surrounding portion of the associated protective cover.

12. A swivel connection as defined in claims 1, 2 or 10, in which:

(h) said inlet and intermediate bodies include exposed surfaces and said first and second protective covers cooperate to protect said otherwise exposed surfaces of said inlet and intermediate bodies.

13. A swivel connection as defined in claims 1, 2 or 10, in which:

(h) said inlet and intermediate bodies include exposed surfaces and said first and second protective covers cooperate to protect said otherwise exposed surfaces of said inlet and intermediate bodies, said covers being at least in part integrally molded to said bodies.

* * * * *